No. 791,929.

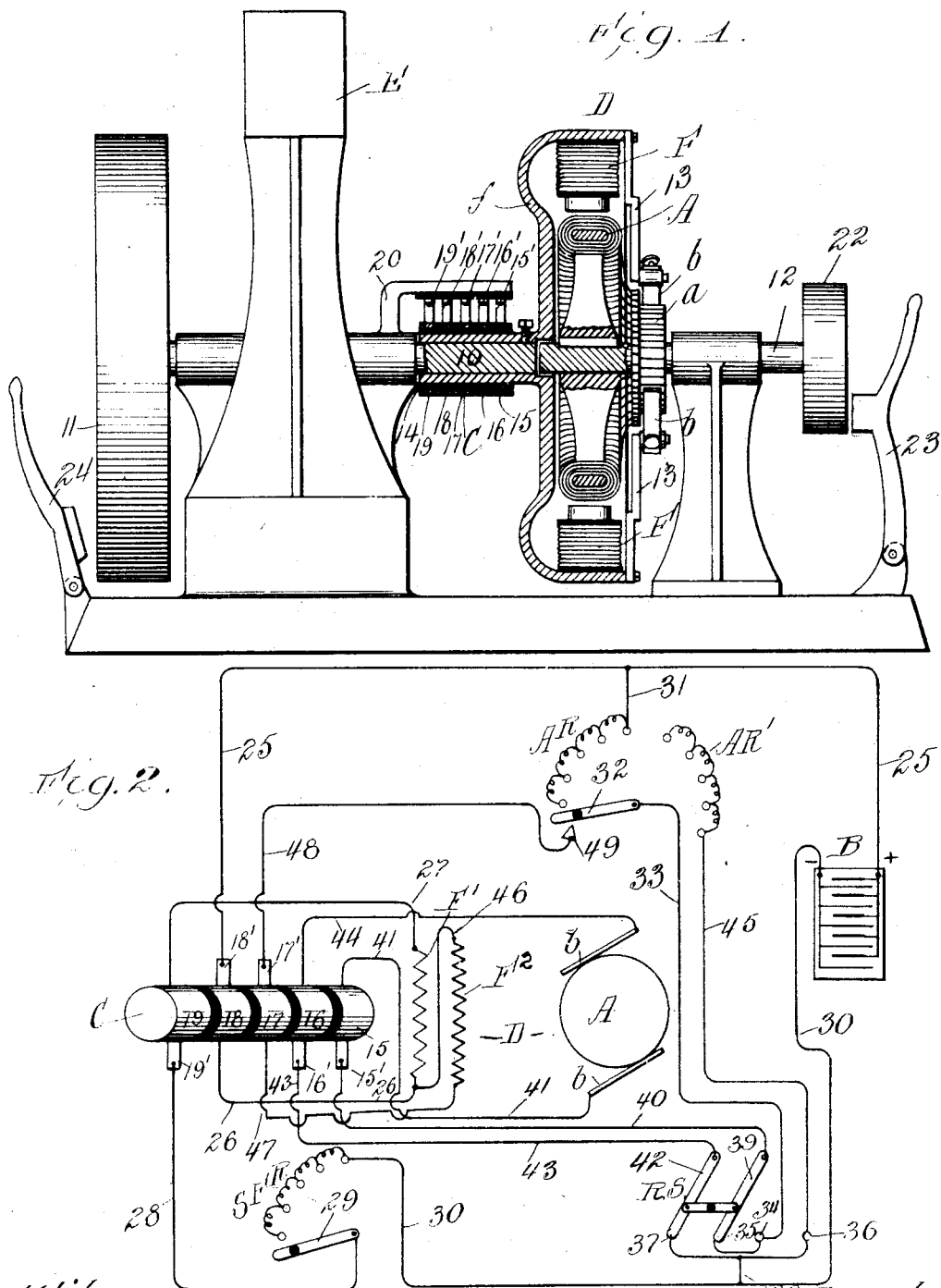

Patented June 6, 1905.

UNITED STATES PATENT OFFICE.

WILLIAM MORRISON, OF CHICAGO, ILLINOIS.

POWER INSTALLATION.

SPECIFICATION forming part of Letters Patent No. 791,929, dated June 6, 1905.

Application filed October 27, 1904. Serial No. 230,214.

*To all whom it may concern:*

Be it known that I, WILLIAM MORRISON, of Chicago, in the county of Cook and State of Illinois, have invented certain new and useful Improvements in Power Installations; and I hereby declare that the following is a full, clear, and exact description thereof, reference being had to the accompanying drawings, which form part of this specification.

My invention relates to power installations, and more particularly to power installations embodying as a primary generator of power a gas-engine.

One of the objects of my invention is to provide, in conjunction with a gas-engine, an electrical equipment whereby energy developed by the gas-engine may be stored for utilization and utilized to start the engine or drive the load and whereby a flexible and efficient power transmission from the gas-engine to the load may be provided. In the installation herein described I provide means for attaining these and further objects which will become apparent to those skilled in the art, and for purposes of such description reference is made to the accompanying drawings, wherein—

Figure 1 is a front view, partly in section and partly in elevation, of certain devices suitable for employment in the practice of my invention; and Fig. 2 is a diagrammatic view illustrating the circuit connections of the electrical equipment.

Throughout the drawings like characters of reference refer always to like parts.

In the drawings, E represents conventionally a gas-engine having an engine-shaft 10, carrying a fly-wheel 11, and to which is connected for rotation one of the field and armature elements of a dynamo-electric machine D. For brevity I will hereinafter refer to said machine D as the "dynamo;" but I desire to be understood that I use said term in its broad sense of a dynamo-electric machine and not as synonymous with "generator." Specifically, $f$ indicates a field-frame of the dynamo secured to the shaft 10 in any suitable manner and carrying the field-magnets, whose coils are indicated at F F.

A indicates the armature of the dynamo, mounted upon an independently-rotatable shaft 12, which I will refer to as the "load-shaft." Said dynamo is provided with a suitable commutator $a$, upon which rest the brushes $b\ b$, rotatable with the field-frame and preferably secured thereto, as by arms 13 13.

For convenience in electrically connecting the rotating parts of the dynamo with stationary auxiliary apparatus I provide a sliding-contact device C of any suitable form, herein illustrated as comprising an insulating-sleeve 14, arranged to rotate with the field-frame $f$ and provided with a suitable number of insulated rings with which contact a like number of stationary brushes. In the specific construction shown five such rings 15, 16, 17, 18, and 19 are provided with coacting brushes 15', 16', 17', 18', and 19', the brushes being preferably supported in insulated relation to each other upon a frame 20, secured to some fixed part of the mechanism—as, for instance, the engine-frame.

Means for transmitting power from the load-shaft and means for stopping said load-shaft are provided, such means being herein illustrated as a pulley 22, typifying a power-transmitting device, and a brake 23, representing a convenient means for checking or stopping the load-shaft or varying the load. It will be apparent, however, that the load itself may be the means for stopping or checking the shaft 12 for purposes of this invention, and the brake 23 may therefore be regarded as equivalent to a load. Preferably I also provide means for stopping and holding at rest the engine E, such means being conveniently illustrated as a brake 24, adapted to work on the fly-wheel 11.

Associated with the devices described are an electric storage battery B and suitable auxiliary devices—such as rheostats, switches, circuit connections, and the like—for accomplishing the purposes herein made evident.

Referring now to the specific equipment shown in Fig. 2, it will be noted that I prefer to employ a compound-wound dynamo having a shunt-field F' and a series field F², the battery B being preferably arranged for electrical connection with both of said fields and with the armature, preferably as by circuits, as follows: From the positive terminal of battery B extends battery-wire 25, connected to brush 18' of the contact device C, from the corresponding ring 18 whereof extends a wire 26 to one terminal of the shunt-field coil F'. The opposite terminal of the shunt-field coil F' is connected by wire 27 with the ring 19 of the contact device, the brush 19' whereof is connected by wire 28 with the arm 29 of a shunt-field-controlling rheostat S F R, the resistance-coils whereof are connected by battery-wire 30 directly with the negative terminal of the battery B. The armature-circuit may be traced as follows: from battery-wire 25 by wire 31 to the resistance-coils of the rheostat A R, the arm 32 whereof is connected by wire 33 with two of the points 34 and 35 of the reversing-switch R S, the opposite points 36 and 37 whereof are tied together and connected by wire 38 with the return battery-wire 30. The two blades of the reversing-switch are connected to the two brushes of the armature-commutator, the blade 39 being connected by wire 40 with the brush 15' of the contact device C, the ring 15 whereof is connected by wire 41 with one of the brushes $b$, and the remaining blade 42 being connected by wire 43 with the brush 16' of the contact device C, the coacting ring 16 whereof is connected by wire 44 with the remaining brush $b$ of the armature A. Means are provided for practically short-circuiting the armature on itself, such means preferably comprising the resistance A R', with the points whereof the rheostat-arm 32 may coact, and resistance A R' being connected by wire 45 with the switch-points 36 37 of the reversing-switch, which contact-points, it will be remembered, are connected by wire 38 with the battery-wire 30. The series field $F^2$ is adapted to be connected in series circuit with the armature between the battery-wires 25 and 29, and to this end one of its terminals is tied by wire 46 to the wire 26, its other end being connected by wire 47 to the ring 17 of the contact device, the brush 17' whereof is connected by wire 48 with the back contact-stop 49 of the rheostat-arm 32.

The operation of the devices connected as described will be as follows: To start the gas-engine, the shunt-field circuit of the dynamo is closed by movement of the arm 29 of the shunt-field rheostat S F R, the circuit being established from battery B by wire 25, brush 18', ring 18, wire 26, the shunt-field F', wire 27, ring 19, brush 19', wire 28, to the rheostat-arm 29 and back to the battery by battery-wire 30. Next the armature-circuit is closed by movement of the arm 32 slowly over the resistance series A R, the circuit being established from the battery-wire 25 by wire 31, resistance A R, rheostat-arm 32, wire 33, to contacts 34 and 35, reversing-switch blade 39, wire 40, brush 15', ring 15, and wire 41, to one brush $b$ of the armature-commutator, returning from the opposite brush by wire 44, ring 16, brush 16', wire 43, switch-blade 42, contact 37, and wire 38, to the return battery-wire 30. Now the load-shaft being at a standstill and a sufficient load assumed to be on, the dynamo D acts as a revolving field-motor, the field-frame carrying with it in revolution the engine-shaft 10, so that the engine E is started in motion. The dynamo continues to act as a motor driving the engine from the storage battery until the engine speeds up to such an extent that it drives the field in rotation at a higher speed than it could acquire as a motor, whereupon the dynamo automatically commences to act as a generator to charge the battery B. To throw the load on the motor, the connection of the armature with the battery B is broken and the armature practically short-circuited on itself by movement of the rheostat-arm 32 over the contacts of resistance A R'. The practical short-circuit thus established may be traced from the upper brush $b$ of the dynamo by the path 44, 16, 16', 43, 42, 37, 36, and 45, to the resistance A R', and through the coacting rheostat-arm 32 by path 33, 34, 35, 39, 40, 15', 15, and 41, back to the lower brush $b$. Now the engine-driven field and the load-carrying armature tend to maintain a circumferentially-fixed relation to each other, and the armature A is started in rotation and is impelled by the field at a slightly-less rate of speed than that of the field, carrying with it the load-shaft 12, through which power is transmitted to the load to be driven. It will be apparent now that the dynamo D under such conditions acts as a magnetic clutch between the engine-shaft and the load-shaft, the speed of the load-shaft being variable with reference to the speed of the engine-shaft by variation of the magnetic moment between the field and the armature by change of current-flow in either the armature short circuit or the field-circuit through manipulation of the rheostat-arms 29 or 32, such variation of current-flow producing variations in the slippage or difference in rate of rotation between the field and armature elements. To charge the battery, the load is stopped by opening the armature-circuit or applying the brake 23, and the load being stopped and rendered relatively immovable either through its inherent resistance or application of brake 23 the armature is again energized, so that with the engine running at full speed the dynamo acts as a generator. It is for this operation that I prefer to employ the compound-wound machine, for by throwing the rheostat-arm 32 against the back-stop 49 the armature-circuit is closed through the series field by a path as follows: from battery-wire 25 through the parts 18', 18, 26, 46 to series field $F^2$, returning through parts 47, 17, 17', 48, 49, 32, 33, 34, 35, 39, 40, 15', 15, 41, the armature A, 44, 16, 16', 43, 42, 37, and 38, back to the return battery-wire 30. In this manner I am enabled to raise the voltage of the now generating dynamo, as will be well understood by those skilled in the art. If it be desired to run the load-shaft in the opposite direction to that in which it will be impelled by the gas-engine, the engine is stopped and the brake 24 applied thereto to maintain the dynamo-frame $f$ in fixed position. The reversing-switch R S is now thrown over to the opposite side from that shown in Fig. 2, so that the connection of the armature is made by the path 25, 31, A R, 32, 33, 34, 42, 43, 16', 16, 44, armature A, 41, 15, 15', 40, 39, 36, 38, and 30 back to the battery B. Now the dynamo D is driven by the battery as a motor, the armature only rotating and that in the opposite direction to the direction of operation of the gas-engine. Obviously, too, if for any reason the gas-engine cannot be worked, its fly-wheel may be braked and the load driven forward by the dynamo acting as a motor.

While I have described in some particularity the connection of devices herein illustrated for purposes of a full disclosure, I do not desire to be understood as limiting myself thereto further than as specified in the claims, as it will be apparent that the devices shown are reduced to simple form for purposes of clearness of disclosure and that many changes might be made therein without departing from the spirit and scope of my invention.

Having thus described my invention, what I claim, and desire to secure by Letters Patent of the United States, is—

1. In a power installation, a gas-engine, a dynamo having both its field and armature rotatable, one of said elements being mechanically connected with the engine, and the other being arranged for mechanical connection with the load, means for energizing the field and armature of said dynamo, means for preventing the rotation of the dynamo element connected with the engine, and means for preventing the rotation of the other dynamo element.

2. In a power installation, a gas-engine, a dynamo having both its field and armature rotatable, one of said elements being mechanically connected with the engine, and the other being arranged for mechanical connection with the load, means for energizing the field and armature of said dynamo, means for reversing the dynamo, and means for preventing the rotation of the dynamo element connected with the engine.

3. In a power installation, a gas-engine, a compound-wound dynamo having both its field and armature rotatable, one of said elements being mechanically connected with the engine, and the other being arranged for mechanical connection with the load, a storage battery, connections between said storage battery, the shunt and series fields and the armature, and means for cutting the series field out of the armature-circuit.

4. In a power installation, a gas-engine, a compound-wound dynamo having both its field and armature rotatable, one of said elements being mechanically connected with the engine, and the other being arranged on an independent shaft, means resisting the rotation of said shaft, a storage battery electrically connected with the series field and armature and with the shunt-field, and means for cutting the series field out of the armature-circuit.

5. In a power installation, in combination, a gas-engine, a dynamo having independently-rotatable field and armature elements, one of said elements being mechanically connected with the engine and the other being arranged for connection with the load, means for energizing the said fields and armature, and means for practically short-circuiting the said armature.

6. In a power installation, in combination, a gas-engine, a dynamo having a rotatable field connected for rotation with the engine-shaft, a rotatable armature arranged for connection with devices for driving the load, means for energizing the fields and armature of said dynamo, and means for practically short-circuiting the armature thereof.

7. In a power installation, in combination, a gas-engine, a dynamo having a rotatable field element and a rotatable armature element, one element being connected for rotation with a part of the engine and the other element being arranged for connection with the load, a storage battery arranged for electrical connection with the dynamo-armature, and means for practically short-circuiting the armature on itself.

8. In a power installation, in combination, a gas-engine, a dynamo having a rotatable field element and a rotatable armature element, one element being connected for rotation with the rotatable part of the engine, and the other element being arranged for connection with a load, a storage battery, circuits for connecting the armature and field of the dynamo with the battery, means for practically short-circuiting the armature of the dynamo on itself, and means, such as the load, for stopping the element of the dynamo connectible with the load.

9. In a power installation, a gas-engine having an engine-shaft, a load-shaft, and means for transmitting power from the engine-shaft to the load-shaft comprising a dynamo having one of its field and armature elements mounted for rotation with the engine-shaft, and the other of its said elements mounted for rotation with the load-shaft, and extraneous means for energizing said field and armature, and means for practically short-circuiting the armature on itself.

10. In a power installation, a gas-engine having a load-shaft, means for starting the engine and transmitting power from the engine-shaft to the load-shaft, comprising a dynamo having both field and armature elements rotatable, one of said elements being connected with the engine-shaft, and the other said element being operatively connected with the load-shaft, means for electrically energizing the field and armature of said dynamo, means for maintaining the load-shaft against rotary movement, and means for short-circuiting the armature on itself.

11. In a power installation, a gas-engine having a shaft, a load-shaft, and a variable-speed power transmission operatively connecting said engine-shaft and load-shaft, comprising a dynamo having both its field and armature elements rotatable, one of said elements being connected with the engine-shaft and the other of said elements being operatively connected with the load-shaft, means for energizing the field of said dynamo, means for practically short-circuiting the armature of said dynamo upon itself, and means for varying the magnetic moment between said elements.

12. In a power installation, a gas-engine having a shaft, a load-shaft, a dynamo having one of its field and armature elements mounted for rotation with the engine-shaft, and the other said element mounted for rotation with the load-shaft, means for holding each of said shafts against rotation, a storage battery, and circuit connections between said battery and the dynamo elements.

In testimony that I claim the foregoing as my own I affix my signature in presence of two witnesses.

WILLIAM MORRISON.

In presence of—
    Geo. T. May, Jr.,
    Mary F. Allen.